Dec. 18, 1934.    R. P. CLARK ET AL    1,984,964
PIPE CLEANER
Filed July 25, 1933
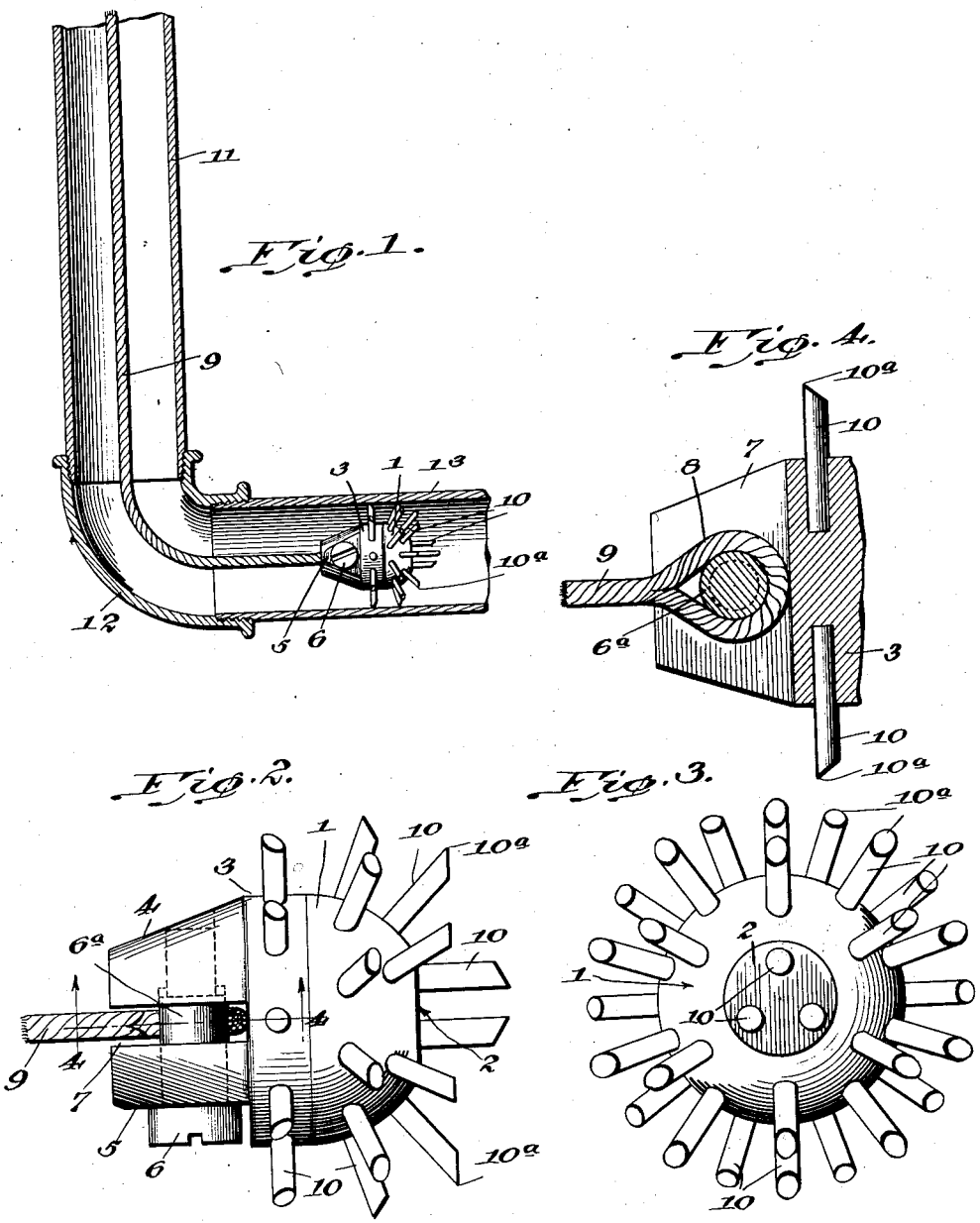
WITNESSES
INVENTORS
R. P. Clark and
H. E. Fee
BY
ATTORNEYS Patented Dec. 18, 1934

1,984,964

UNITED STATES PATENT OFFICE 1,984,964

PIPE CLEANER

Robert P. Clark and Henry E. Fee, Phoenix, Ariz.

Application July 25, 1933, Serial No. 682,124

1 Claim. (Cl. 15—104.30)

Our invention relates to improvements in pipe cleaners, and it consists in the combinations, constructions and arrangements herein described and claimed.

An object of our invention is to provide a pipe cleaning device which may be attached to a flexible cable so as to be rotated around its central axis, and also to be moved forwardly by the cable or other suitable flexible member for cutting through an obstruction, and for scouring the sides of the pipe.

A further object is to provide a device of the kind described, in which there is a cutting or boring action when the device is revolved, so as to loosen any stoppage from grease, dirt, or the like, while permitting a flow of water or liquid past the pipe cleaner to wash such grease, dirt, etc. away.

A further object is to provide a device which is particularly adapted for removing hair, mats of strings, wash cloths, pieces of chamois skin or root clusters which become entangled with the device and can be readily withdrawn from the pipe.

Other objects and advantages will appear in the following specification and the novel features of the invention will be particularly pointed out in the appended claim.

Our invention is illustrated in the accompanying drawing forming part of this application, in which:

Figure 1 is a sectional view of a pipe showing the device in use.

Figure 2 is an enlarged perspective view of the pipe cleaner.

Figure 3 is an end view, and,

Figure 4 is a sectional view on the line 4—4 of Fig. 2.

In carrying out our invention we provide a body portion 1 which is preferably of solid bronze. The forward end of the body portion is rounded and terminates in a flat surface 2. There is a cylindrical portion 3 and a tapered rear portion 4. The portion 4 has a part cut away to provide a flat surface 5. A bore extends inwardly from the flat surface 5 to receive a screw 6. A slot 7 is formed extending from the rear end toward the cylindrical portion 3. That part of the tapered portion 4 on the opposite side of the slot from the flat portion 5 is threaded to receive the screw, and there is a reduced portion 6a of the screw which registers with the slot and which is arranged to receive the eye 8 of a flexible member 9, such as a cable, which when thrust into the pipe will cause the movement of the cleaning device forwardly or rearwardly, but which when rotated will also cause the rotation of the cleaning device.

As will be seen from the drawing, and particularly Figure 4, the body portion is provided with a plurality of bores extending toward the central axis. Each bore is provided with a pin or finger such as those shown at 10. Those pins or fingers on the cylindrical portion 3 are arranged in circular alinement. Those on the rounded portion are inclined forwardly and in the present instance there are shown three of these fingers extending parallel to the central axis of the device from the flat portion 2. These pins or fingers are made preferably of steel wire, and they are held frictionally in the body portion or in any other suitable manner. The ends, as will be observed, are tapered so as to provide sharpened cutting edges 10a.

From the foregoing description of the various parts of the device the operation thereof may be readily understood. As has been stated, the eye 8 of the flexible member 9 is disposed in the slot 7 and the screw is then tightened so as to provide a bearing 6a, thus giving a pivotal connection of the cleaning device with the cable. When the device is thrust into a pipe, as for instance downwardly through the pipe 11 in Fig. 1, and meets the elbow 12, the rotation of the cable 9 together with the pivotal movement, will cause the cleaning device to move forwardly through the elbow and into the pipe 13. Continued rotation and thrust on the cable 9 will cause the fingers 10 to cut through any grease, those fingers on the cylindrical portion 3 scouring the sides of the pipe as the cleaning device is advanced.

The arrangement of the fingers or pins tends to enmesh any strings, lint, rags or any other such material, and to twist these obstructions, thus getting a firm grip on them, and they can be removed by simply withdrawing the cable.

It frequently happens that a pipe is nearly clogged with grease or dirt, and the only way to get it out is to bore through the obstruction. This is readily done by the pipe cleaner which forms the subject of the present invention. At the same time water can be turned into the pipe so as to reach the obstruction during the boring operation, so that the grease can be flushed out.

The cleaning device as described, may be made in various sizes to accommodate different pipes.

We claim:

In a pipe cleaning device, a body member, a plurality of rigid spaced apart pins disposed at equal distances from the central axis of the body member and projecting forwardly from the end thereof, a plurality of rows of spaced apart pins secured to said body portion, said pins being inclined forwardly at an angle to the longitudinal axis, the ends of the pins on one row terminating in a plane at right angles to the axis and at equal distances from the center and the ends of the pins of an adjacent row in the rear being in a common plane at right angles to the axis and at equi-distant points farther away from the center than the ends of the pins of the adjacent row in front.

ROBERT P. CLARK.
HENRY E. FEE.